Dec. 15, 1931.                G. ALMQUIST                1,837,092
                                PIPE FORM
                         Filed April 5, 1930        2 Sheets-Sheet 1
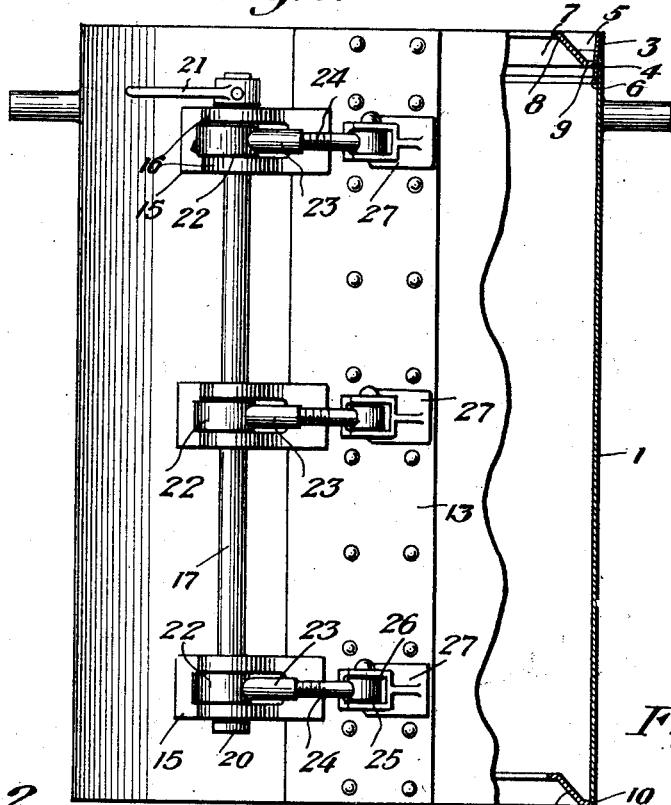
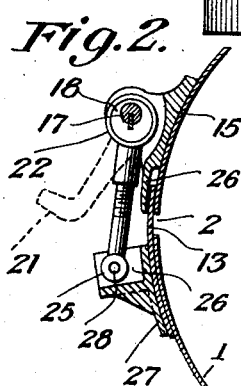
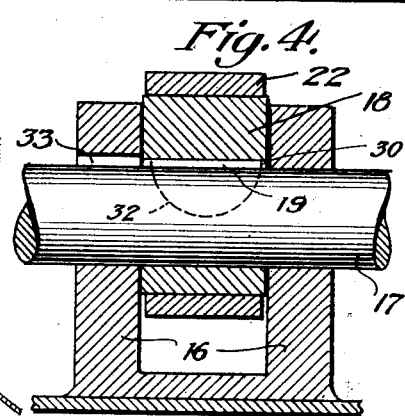
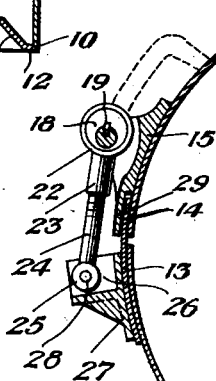
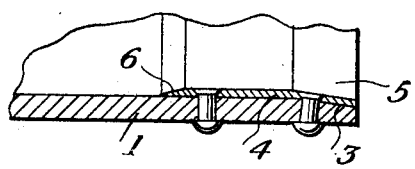
Gus Almquist
INVENTOR
BY Victor J. Evans
ATTORNEY Dec. 15, 1931.   G. ALMQUIST   1,837,092
PIPE FORM
Filed April 5, 1930    2 Sheets-Sheet 2
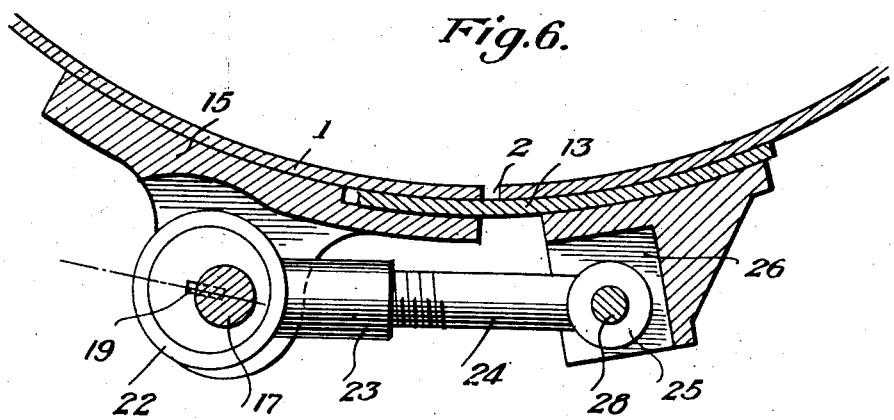
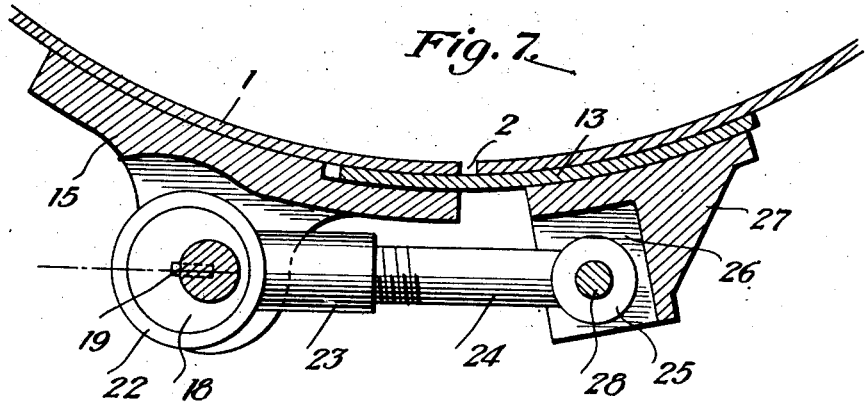
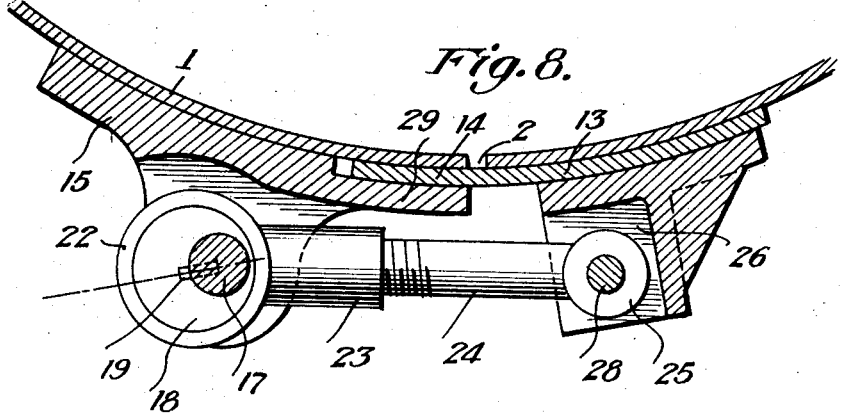
Gus Almquist
INVENTOR
BY Victor J. Evans
ATTORNEY Patented Dec. 15, 1931

1,837,092

UNITED STATES PATENT OFFICE

GUS ALMQUIST, OF PERRIS, CALIFORNIA

PIPE FORM

Application filed April 5, 1930. Serial No. 441,939.

This invention relates to concrete pipe forms for use in connection with a stripping machine, and the invention has as one of its objects to provide a form which will be exceptionally substantial and not liable to become dented or distorted.

Pipe forms of this class are ordinarily made expansible and contractible, so that after the form has been closed and the pipe has been molded and set, the form may be expanded so as to permit of its withdrawal from the molded pipe section, and it is therefore desirable, in order to prevent bending or distortion of the form, that the same be made of heavy cast steel and consequently it is desirable that the means for expanding and contracting the form be equally substantial and positive in its action and yet capable of operation without expenditure of the force ordinarily required in closing such forms, where the forms are made of thin sheet metal, in which instance they present the disadvantage above set forth. Therefore, the present invention has as another object to provide a novel means whereby the form may be drawn closed and likewise released so as to permit of its expansion, in such a manner as to insure against damaging the molded pipe.

Another object of the invention is to provide a form which will be substantially air tight when it is closed, for the molding of the pipe so that the concrete will hold its form until it is set. In the old types of forms for molding concrete pipe, a stationary ring has been employed in the upper end of the mold form, and this ring is lifted off when the pipe has been molded and the pipe then stripped without any protection being offered to the end of the pipe, with the result that a great number of the molded pipes are spoiled or damaged in the stripping operation, and therefore the present invention has as a further object to provide, in a mold form of this class, a ring, so mounted, in the mold form that it will remain in place upon the upper end of the molded pipe when the form is stripped from the pipe, thus protecting this edge and preventing the deformation of this portion of the pipe.

This invention also consists in certain other features of construction and in the combination and arrangement of the several parts to be hereinafter fully described, illustrated in the accompanying drawings and specifically pointed out in the appended claim.

In describing my invention in detail, reference will be had to the accompanying drawings wherein like characters denote like or corresponding parts throughout the several views, and in which:—

Figure 1 is a view illustrating the mold form embodying the invention.

Figure 2 is a horizontal sectional view through one side of the mold form illustrating the mold form, and the contracting and expanding means therefor in position to expand the form.

Figure 3 is a similar view illustrating the expanding and contracting means in position to contract the form, the operating lever being shown in broken lines.

Figure 4 is a detail sectional view through a part of the expanding and contracting means.

Figure 5 is a detail sectional view through the upper end of the body of the form, the top ring thereof being removed.

Figures 6, 7 and 8 are detail views similar to Figure 2 illustrating the relative arrangement of the upper, intermediate and lower eccentrics of the mold form.

The mold form embodying the invention comprises a hollow cylindrical body 1 which is preferably of heavy sheet steel and this body is divided vertically at one side, as indicated by the numeral 2 and, at its upper end the body is interiorly beveled as indicated by the numeral 3 and a ring 4 is fitted in this end of the body and has an outwardly flared upper portion 5 which seats against the beveled surface 3, the ring being interiorly beveled at its lower edge as indicated by the numeral 6. Another ring, indicated by the numeral 7 is designed to be fitted into the upper end of the body within the circumference of the ring 4 and this ring is of substantially frusto-conical form and is provided at its upper edge with an inwardly projecting relatively narrow flange 8 and at its lower edge with an outwardly projecting relatively narrow flange 9, which latter flange seats at its margin against the inner side of the ring 4. The body is also tapered at its inner side and at its lower edge, as indicated by the numeral 10, and a ring 11 of the same formation as the ring 7 is seated in this end of the body, and the outstanding flange of this ring is beveled as indicated by the numeral 12 so as to engage the taper 10 of the lower end of the wall of the body.

In order that the space formed by the vertical division of the body may be closed, a plate 13 is welded to the outer side of the body at one side of the division line or split 2 and has a portion 14 projecting beyond this edge of the body, and designed to overlap the opposite edge of the body.

Welded or otherwise suitably secured to the outer side of the body 1 at one side of the line of division are a series of bearings indicated by the numeral 15, and each including a pair of spaced apertured ears 16, and a shaft 17 is mounted in the apertures in the ears and eccentrics 18 are fitted upon and keyed to the shaft, as indicated by the numeral 19, each between the ears of a respective one of the bearings 15. The shaft is provided at its lower end with a head 20 to engage beneath the lower ear of the lowermost one of the bearings 15, and a crank handle 21 is secured to the upper end of the shaft preferably by a cross pin, and is located directly above the upper one of the ears of the uppermost one of the bearings 15. A ring 22 is fitted to each eccentric 18 and is provided with an integral outstanding threaded socket 23 into which is threaded one end of the stem 24, and provided at its opposite end with a collar 25 seated in and pivotally mounted between the sides of a recess 26 formed in a member 27 which is welded to the plate 13, the pivot for the stem comprising a pin 28 which is fitted through an opening in the collar 25, and through the side walls of the said recess in the member 27.

In order to further insure of a tight closure for the divided side of the form, each bearing member 15 is formed at that side of its base which is presented toward the division of the wall of the form with a lip 29 which projects over the expanded edge portion 14 of the plate 13 so that this portion of the plate is reinforced against any outward spreading.

In order that the eccentrics may be properly assembled with the shaft 17, each eccentric is formed in one side of the opening therein with a groove 30 and the keys 19 for connecting the eccentrics for rotation with the shaft 17, are seated in narrow recesses 32 formed in one side of the shaft, and in assembling the parts, the sockets 23 of the eccentrics are threaded onto the stems 24 to the proper point of adjustment, and the rings are then disposed between the ears 16 of the respective bearings 15, and the shaft 17 is then fitted upwardly through the openings in the ears 16 and in the eccentrics 18 until the key recesses 32 are relatively close to the lower ear of each respective bearing, whereupon the keys are fitted into the recesses and the shaft is further shifted upwardly to effect engagement of the keys in the grooves 30, the said lower ear of each bearing being provided in one side of its wall with a groove 33 to permit of free passage of the projecting end of the respective key 19.

In the use of the form, the ring 7 is fitted downwardly in the beveled upper end 5 of the ring 4, and the turning table of the molding machine, in connection with which the form is used, is rotated to bring the form under the packer head of the mold which is lowered into the form through the rings 7 and 11 until it reaches the bottom of the form and rests at its lower end upon the said table. In stripping the form, after the concrete has set, the ring 7 is left on top of the molded pipe, in the upward movement of the form, and inasmuch as the body of the form rests at its beveled lower end 10 upon the beveled edge 12 of the lower ring 11, this ring will likewise remain at the bottom or lower end of the pipe.

It will be evident from the foregoing that by the mere actuation of the lever 21, all of the eccentrics are simultaneously rotated so as to either close the form or expand the same and due to the use of this type of connection between the portions of the form body at the opposite sides of the line or division, the opening and closing of the form may be accomplished with little effort.

As shown in Figures 6, 7 and 8 of the drawings, the keys 19 which secure the eccentrics of the upper intermediate, and lower eccentrics of the contracting and expanding units, are so positioned with respect to the circumference of the shaft 17 as to mount the eccentrics in such relatively different angular positions with regard to the eccentrics as to effect opening or spreading of the open side of the form, initially, at the bottom of the form and, finally at the top of the form, so that the form is caused to assume a slightly tapered shape as it is expanded and this permits of the entrance of air into the form, about the pipe, at the bottom of the form and thereby prevents the formation of a partial vacuum which is liable to result when the form is opened or expanded uniformly throughout its length and as this causes the form to somewhat adhere to the pipe, the pipe is liable to be split lengthwise, thereby resulting in a great loss to the manufacturer. For example, it will be observed by reference to Figure 6, which represents the eccentric and key, therefor, which is upper most, in the series, the key is displaced, in the direction of the form body, a distance of approximately 5° from the position of the key of the intermediate eccentric shown in Figure 7, which key is directly on a line coincident with the axis of the stem 24, and, in the instance of the eccentric and key shown in Figure 8, which is the lowermost one of the series, the key is displaced in a direction away from the body of the form a distance equivalent to 5° and, due to this relatively initial positioning of the eccentrics, expansion of the form, in the manner stated above, is effected and therefore the form may be withdrawn from the molded pipe without any likelihood of damage to the said pipe or any likelihood of splitting of the same.

What I claim is:—

In a pipe mold form, a hollow cylindrical body divided longitudinally at one side, a shaft mounted at one side of the line of division of the body, eccentrics fixed for rotation with the shaft, means for manually rotating the shaft, a ring surrounding each eccentric, and a stem extending from each ring and pivotally connected with the body at the other side of the line of division, the eccentrics being arranged in a vertical series and the major axes of the eccentrics intersecting the axis of the shaft, throughout the series, the major axis of the intermediate eccentric and the axis of the shaft lying in a plane which bisects the angle between the corresponding planes of the end eccentrics.

In testimony whereof I affix my signature.

GUS ALMQUIST.